UNITED STATES PATENT OFFICE.

RUDOLF REISS, OF CHARLOTTENBURG, AND OTTO SCHMATOLLA, OF BERLIN, GERMANY.

PROCESS OF MAKING INSOLUBLE ALUMINUM ACETATE.

No. 801,158.        Specification of Letters Patent.        Patented Oct. 3, 1905.

Application filed April 24, 1905. Serial No. 257,275.

*To all whom it may concern:*

Be it known that we, RUDOLF REISS, chemist, of 27 Crolmannstrasse, Charlottenburg, near Berlin, and OTTO SCHMATOLLA, chemist, of 63 Klopstockstrasse, Berlin, Kingdom of Prussia, Germany, have invented a new and useful Process for the Production of an Insoluble Acetate of Aluminum, of which the following is a specification.

The purpose of the present invention is the production of an insoluble basic acetate of aluminum of high degree for technical and especially medical purposes.

The production of insoluble acetates of aluminum has hitherto not been extensively practiced by the chemical industries, because it was both difficult to produce said acetates in any desired amount and because there was no practical process known to obtain a uniform product. Of all known aluminates the acetate is of the greatest importance in medicine as a non-poisonous and energetic astringent, while the dry aluminum hydroxid is valued as a non-poisonous exsiccant, so that an acetate of aluminum of high degree and not very soluble would fill the want of a very mild astringent, and quite non-poisonous exsiccant, which when used would split off acetic acid and only small quantities of acetate.

Insoluble forms of acetate of aluminum may be precipitated if the known watery solutions of acetate of aluminum are boiled. The precipitates are, however, very finely suspended and of so small quantity that it would scarcely pay to separate them. Above all, these precipitates are of an inconstant composition and always prove to be mixtures of various basic acetates with different percentages of acetic acid and water. Of these only the more dense ones, rich in acetic acid, can be separated in the usual manner, whereas the basic acetates will readily pass through the filter, owing to their fineness, and thus be lost. The precipitate deposited from neutral solutions of acetates when boiled consists of one-half acetate. These compounds, however, are always partially soluble in water. The same is the case if highly-diluted watery neutral solutions of acetates containing three-fourths per cent. of alumina are mixed with a great quantity of pure acetic acid and boiled. Also mixtures of insoluble acetates are precipitated by this process, which contain water and are therefore partially soluble. If boiled with much water, they will be almost entirely dissolved.

An acetate of aluminum almost insoluble and of a high degree, containing about seventy-two per cent. of acetic acid, may be obtained from the watery solutions of the acetates of aluminum of the usual concentration of about five per cent. by mixing the same with a quantity of acetic acid and boiling the same while it is continually stirred. The acetic acid can be added while the solution of the acetate is being boiled. When the solutions of the acetate are made in the usual manner from sulfate of aluminum, carbonate of calcium, and acetic acid, an excess of acetic acid can be added at once, or if the solution is prepared from the hydroxid of aluminum the hydroxid of aluminum can be treated at once with an excess of acetic acid. The precipitation is quite rapid and the result is very productive. The precipitate is dense and free from all finely-suspended, insoluble, and highly-basic acetates, which are poor in acetic acid. In consequence the precipitate can be separated easily and without loss. The precipitation can be assisted by an increased concentration of the solutions of the acetate of aluminum. In this case it will not even be necessary to heat the solution, as the insoluble acetate is formed already if the acidulous solution is left alone for some time. The same insoluble acetate of aluminum of high degree is obtained if the watery solutions of the neutral acetates are heated under pressure, and an ample produce is thus insured.

In our process a concentrated solution of acetate of aluminum containing about fifteen per cent. acetate is mixed with concentrated acetic acid in a quantity corresponding to about the third part of the volume of the solution of acetate and then, while boiling, it is constantly stirred as long as there will fall a precipitate in considerable quantity, or the solution may be permitted to stand for some time without boiling, or, finally, a watery solution of neutral acetate of aluminum of about fifteen per cent. may be heated in an autoclave. The precipitate is separated in all instances in the usual manner and is then washed and dried.

Having thus described our invention, what we desire to secure by United States Patent and claim is—

1. The process of producing an insoluble acetate of aluminum, which consists in mixing a concentrated solution of acetate of aluminum with concentrated acetic acid, in the proportions described, separating the precipitate, and washing and drying the same.

2. The process of producing an insoluble acetate of aluminum, which consists in mixing a concentrated solution of acetate of aluminum with about one-third its quantity of concentrated acetic acid, boiling the mixture, stirring the mixture while it is boiling, separating the precipitate, and washing and drying it, substantially as described.

In witness whereof we subscribe our signatures in presence of two witnesses.

RUDOLF REISS.
OTTO SCHMATOLLA.

Witnesses:
   WOLDEMAR HAUPT,
   HENRY HASPER.